UNITED STATES PATENT OFFICE.

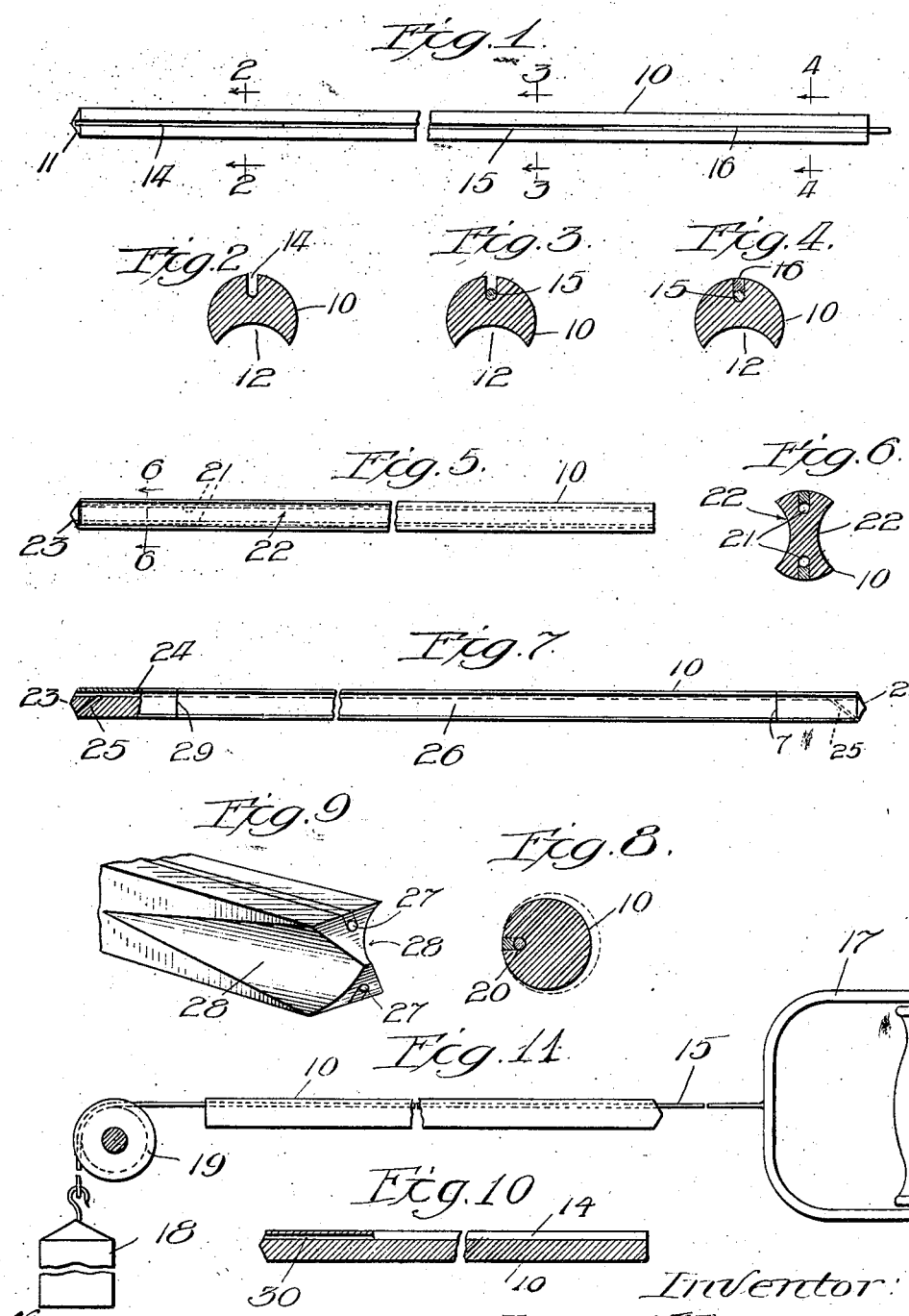

JOHN J. KUNZER, OF CHICAGO, ILLINOIS, ASSIGNOR TO JOSEPH T. RYERSON & SON, OF CHICAGO, ILLINOIS, A CORPORATION OF ILLINOIS.

METHOD OF MAKING DRILLS OR THE LIKE.

1,379,994.                       Specification of Letters Patent.       Patented May 31, 1921.

Application filed May 4, 1918. Serial No. 232,477.

*To all whom it may concern:*

Be it known that I, JOHN J. KUNZER, a citizen of the United States, and a resident of Chicago, in the county of Cook and State of Illinois, have invented certain new and useful Improvements in Methods of Making Drills or the like; and I do hereby declare that the following is a full, clear, and exact description thereof, reference being had to the accompanying drawings, and to the characters of reference marked thereon, which form a part of this specification.

This invention relates to a novel method of making hollow drills and the like for deep drilling or cutting work, such, for instance, as drilling stay bolts for locomotives, drilling gun barrels, and the like, and the object of the invention is to provide a novel method for producing drills or like cutting tools equipped with a longitudinal duct or ducts through which a cutting compound is fed under pressure to the cutting end of the tool, both for the purpose of lubricating the cutting end of the tool to maintain it suitably cool and to furnish means for flushing out the chips from the cutting end of the tool backwardly through a longitudinal flush channel or channels of the tool and to thereby prevent the hole being drilled or otherwise cut from becoming clogged.

In the following description my invention is described with particular reference to deep drilling, but it will be understood that the invention may be exemplified in or in connection with other cutting tools such as reamers or the like.

Drills for deep drilling work are required to be made of considerable length, with respect to their diameters, and it is also necessary that said drills be made of great strength, to avoid twisting of the drill under the torsional stress imposed thereon.

In order that a drill for this purpose may be sufficiently sturdy to withstand the stresses imposed upon it in this work, it is desirable that the drill be made of a continuous piece of steel or like material, by which is intended to include a drill having a specially hardened bit or cutting end welded to the shank or bar of the drill or wherein the entire drill is made of the same material, with the cutting end properly tempered.

In drills of the smaller sizes, as, for instance, from $\tfrac{5}{16}$ inch and smaller, it is not practicable to drill a duct for a cutting compound throughout the length of the drill; and even in larger drills of considerable length the drilling of such duct is attended with considerable difficulty.

It is the purpose of the present invention to provide a method of making drills with longitudinal cutting compound ducts in such a way that it is practicable to produce such drills of diameters heretofore not possible and also to more readily produce such cutting compound ducts in larger drills.

In accordance with my novel method of producing drills, a bar of any suitable or preferred cross section, and of the proper length, is longitudinally grooved to a suitable depth, either by being originally formed with a groove, as by a rolling, swaging, drawing or extruding process, or by a subsequent milling operation, the groove extending to and opening at the cutting end or bit of the drill. Said groove may be made of any particular cross section desired. After the slot has been completed, a filling strand of any suitable material, such as steel, is laid in the groove. Thereafter the portion of the groove exterior to the strand is filled with a metal suitably applied so as to be permanently held therein and to constitute part of the drill bar. Said metal may be of a character which is capable of being welded, brazed or otherwise bonded to the metal of the drill at the sides of the groove, or the filling metal may be pressed, hammered, or rolled into the groove under heavy pressure. After the filling metal has been applied, the strand may be withdrawn endwise from the slot, thereby leaving a duct in the drill of a diameter slightly greater than the exterior diameter of the strand. If the strand be hollow it may remain in the slot of the drill to constitute the duct for the cutting fluid.

The material by which the groove exterior to the duct forming strand is filled may be applied in a molten state and caused to be formed therein and welded or bonded to the side walls of the groove. The material when thus applied to fill the groove may be fused either by an electrical or flame fusing method.

When the material is applied in a molten state, means are provided for preventing the welding or bonding heat of the filling material from overheating or melting the material of the duct forming strand during the welding or bonding operation. This may be effected by covering the duct forming strand with a coating of heat insulating material, such, for instance, as asbestos, or may be effected by producing continuous relative endwise movement of the strand and drill during the time the slot is being thus filled.

The insulating coating, when employed, not only serves to thus protect the strand from overheat, but also, by its presence, offers sufficient freedom of movement to the strand, when the filling material has cooled, to permit the strand to be drawn endwise from the slot, thus leaving a longitudinal duct of the desired diameter in the drill bar.

If a continuous endwise relative movement of the strand and drill be maintained while the groove is being thus filled, the strand does not become overheated in any one place to an extent to cause it to be softened by the welding, brazing or bonding heat. Therefore, the strand does not bind against the walls of the groove or stick therein.

Such relative endwise movement of the strand and drill will also be maintained when the filling metal is pressed, hammered, or rolled into the groove, so as to thereby prevent the strand being compressed in the groove in such manner as to make its subsequent withdrawal difficult or impossible. This relative endwise movement of the strand and drill may be effected by moving either of the parts with respect to the other. When the strand is moved, any suitable method may be employed for thus continuously moving it in the groove. For instance, the strand may constitute a portion of an endless wire which may be trained over and continuously driven by suitable means in one direction; or the strand may be reciprocated in any suitable manner through the groove.

A drill may be thus provided with one longitudinal duct or with two parallel ducts, or said drill may be provided with a single longitudinal duct opening at the cutting end of the drill, and provided at the cutting end of the drill with a shorter oblique duct which opens also at the cutting end of the drill and intersects the longer duct. The said duct or ducts may be made by continuing the groove or grooves to the cutting end of the drill, or the groove or grooves in which the duct forming strands are laid may be discontinued short of the end of the drill bar and the duct or ducts at said cutting end formed by drilling openings which aline with said grooves. By so drilling the duct or ducts at the cutting end of the drill, the cutting bit or bits are not subjected to the welding, brazing or bonding heat of the groove filling material when the material is applied in a manner to be thus secured to the drill.

The drill is completed by forming one or more longitudinal chip clearance grooves therein. When the drill bar is rectangular such chip clearance grooves, except at the cutting end of the drill may not in some instances be required.

In the drawings are illustrated a number of modifications of drills constructed in accordance with the novel method herein disclosed wherein the groove is closed by applying the filling metal in a molten state, and in the following detailed description, reference is made to this specific phase of the process. It will be understood, however, that said method may be adapted to other specific types of deep drills, within the spirit and scope of the invention, and, further, that the groove filling material may be applied to and formed in the groove by the pressure method set forth in my application for United States Letters Patent Serial Number 248,724 filed on the seventh day of August, 1918.

As shown in the drawings,

Figure 1 is a broken plan view of a drill, showing in different portions of its length different stages of the method of producing the longitudinal cutting fluid duct therein.

Figs. 2, 3, and 4 are cross sections on the lines 2—2, 3—3, and 4—4 of Fig. 1.

Fig. 5 is a broken side elevation, showing another modification.

Fig. 6 is a cross section on the line 6—6 of Fig. 5.

Fig. 7 is a broken side elevation of a drill, showing a further modification.

Fig. 8 is a cross section of a cylindric drill bar, showing one method of finishing the drill.

Fig. 9 is a perspective view of a further modification.

Fig. 10 is a modification, showing a still further modification.

Fig. 11 illustrates one means of continuously moving the duct forming strand in the groove during the welding or bonding operation.

As shown in Fig. 1, 10 designates the drill as a whole and 11 designates its cutting end or bit, the latter to be made of any preferred or desirable form. The drill shown in Fig. 1 is cylindric, its cross section being indicated in Figs. 2, 3, and 4. Said drill is provided with a longitudinal chip clearance groove 12.

In Fig. 2, and also near the cutting end of the drill, is shown the groove 14 to receive the duct forming strand, said groove being formed in any suitable manner. It may be made of any preferable cross section or dimension.

In Fig. 3, and at the corresponding portion of Fig. 1, is designated the duct forming strand 15, preferably consisting of a steel wire of proper diameter to fit the bottom of the groove. The cross section of said strand and the consequent cross section of the groove may be varied as desired to produce a resultant duct of a preferred cross section.

In Fig. 4, and at the corresponding portion of Fig. 1, 16 designates the body of metal which fills the groove 14 exterior to the duct forming strand. This body of metal may be applied to the slot in a molten state and welded or bonded to the side walls of the slot, or the filling material may be otherwise applied and fixed to the metal of the groove wall. During the time the groove is being thus filled the strand 15 may be protected from overheating by a coating of insulating material, or said strand may be kept continuously in motion, as by the means illustrated in Fig. 11. As shown in said Fig. 11, the strand may be attached at one end to a hand piece 17 and may be attached at its other end to a weight 18, the strand being trained between the weight and the drill bar over a sheave 19. During the time the groove is being filled with the molten metal or during the time the welding, brazing or bonding heat is applied, or during the time the pressure is applied to the filling material to force and fix it in the groove, as set forth in my aforesaid application, the strand may be pulled endwise in one direction by the handle 17 and, when pulling stress on said handle is released, pulled in the other direction by the weight 18. Other means to maintain the strand in motion may be employed.

After the groove has been thus filled the drill bar may be peripherally finished to cut away any portion of the groove filling metal which may project beyond its periphery and to also provide the required drill clearance along the bar.

In some instances the bar may be originally made of greater diameter than the finished drill, as illustrated by the dotted eccentric outline in Fig. 8, and the metal of the bar included between dotted and full outline cut away to produce the desired clearance. In this event the said bar may be finished about an axis eccentric to the axis of the original bar, so as to thereby avoid cutting away any appreciable thickness of the groove filling material.

The drill shown in Figs. 5 and 6 is provided with two ducts 21 and may be provided with two chip clearance grooves 22. In this construction the said ducts may be located at opposite sides of the axis of the drill bar, or otherwise, and the chip clearance grooves may be likewise symmetrically disposed. The two ducts and clearance grooves may be employed in connection with a double lipped cutting end 23, each duct opening near each cutting lip or bit.

In the drill shown in Fig. 7 a single longitudinally disposed duct 24 is provided which communicates, near the double lipped cutting end 23 with an oblique duct 25 which extends to and opens at one of the cutting lips of the drill, the main duct 24 extending to and opening at the other cutting lip. In this construction the drill may be provided with two longitudinal chip clearance grooves 26, one of which is shown in Fig. 7.

In Fig. 9 a drill bar of rectangular cross section is shown. In said Fig. 9 two ducts 27 are provided in connection with two cutting lips; said ducts being located on opposing side faces of the drill bar. In this construction the flat faces of the drill bar, which meet at angles at the corners of the drill where the drill coincides with the circular hole which it cuts, may provide the necessary chip clearance channels without the necessity of providing clearance grooves therein, as in the cylindric drills. The two opposed sides of the rectangular drill bar at the cutting end thereof may be provided adjacent to the cutting lips with short clearance recesses 28, depending upon the cross section of the bar, which, rearwardly from said cutting lips, merge into the sides of the drill bar.

In some instances, the cutting end of the drill may be made of a harder steel than the remainder of the drill bar and welded to the bar, as, for instance, at the point indicated by the line 29 in Fig. 7. It will be observed, however, that the drill bar in each instance is made of a continuous piece of material of such character and of such ruggedness as to withstand the severe work imposed thereon in deep drilling.

In the construction shown in Fig. 10, the cutting compound duct is formed partially by the groove and filling method before described, and partially by drilling a duct 30 through the body of the cutting end of the drill bar. In such instance, the groove to receive the duct forming strand is terminated short of the cutting end, and the duct 30 drilled in said cutting end to aline with said groove. An advantage of this construction is that the cutting end or bit of the drill is not subjected to the welding, brazing, or bonding heat of the material to fill the groove.

Both ends of the drill may be formed to provide drill bits or lips 23, as shown in Fig. 7, in which event the chip clearance groove or grooves 26 are extended from and to the end of the drill. In such construction the drill may be made somewhat longer than a single bit drill so as to provide the necessary clearance for the required depth of drilling. In such a drill, after one end of the drill has been worn away by continued sharpening to the clearance diameter of the shank or bar, the drill may be reversed to likewise use the other end thereof.

Reference in the specification and claims to drills is not intended to restrict the invention to drills in the limited sense of that term, but is intended to include all similar tools such as reamers, threaders, or the like, where similar working conditions obtain.

I claim as my invention:

1. The improved method of making drills having longitudinal lubricating ducts, which consists in inserting a longitudinal duct forming strand in the body of the drill, and thereafter covering the strand with a metal filler.

2. The improved method of making drills having longitudinal lubricating ducts, which consists in laying a duct forming strand in a longitudinal groove of the drill bar and thereafter filling said groove and welding or bonding the filling material to the walls of said groove and effecting relative endwise movement of the strand and drill bar during the filling operation.

3. The improved method of making drills having longitudinal lubricating ducts, which consists in laying a duct forming strand in a longitudinal groove of the drill bar, thereafter filling said groove with a metal filler and fixing the filler metal therein, and finally withdrawing the duct forming strand.

4. The improved method of making drills having longitudinal lubricating ducts, which consists in laying a duct forming strand in a longitudinal groove of the drill bar, thereafter filling said groove and welding or bonding the filling material to the walls of said groove, and finally withdrawing the filling strand.

5. The improvement in the method of making drills having longitudinal lubricating ducts, which consists in longitudinally grooving the drill bar, laying a duct forming strand in said groove, and thereafter filling said groove and effecting relative endwise movement of the drill bar and strand during the filling operation.

6. The improved method of making drills having longitudinal lubricating ducts, which consists in longitudinally grooving the drill bar, laying a duct forming strand in said groove, filling the remaining portion of said groove, and thereafter withdrawing the filling strand from said groove.

7. The improved method of making drills having longitudinal lubricating ducts, which consists in laying a duct forming strand in a longitudinal groove of the drill bar, thereafter filling said groove with a molten material and fixing it to the walls of the groove, and protecting said strand from sticking in the groove during the welding or bonding operation.

8. The improved method of making drills having longitudinal lubricating ducts, which consists in laying a duct forming strand in a longitudinal groove of the drill bar, thereafter filling said groove with a molten material and welding or bonding it to the walls of the groove, and protecting said strand from overheating during the welding or bonding operation.

9. The improved method of making drills having longitudinal lubricating ducts, which consists in laying a duct forming strand in a longitudinal groove of the drill bar, thereafter filling said groove with a molten material and welding or bonding it to the walls of the groove, and continuously moving the strand in said groove during the welding or bonding operation.

10. The improved method of making drills having longitudinal lubricating ducts which consists in laying a duct forming strand in a longitudinal groove of the drill bar, filling said groove with a molten material and welding or bonding it to the walls of the groove, protecting said strand from overheating during the welding operation, and thereafter withdrawing the strand endwise from said groove.

11. The improved method of making drills having longitudinal lubricating ducts which consists in laying a duct forming strand in a longitudinal groove of the drill bar, thereafter filling said groove with a molten material and welding or bonding it to the walls of the groove, continuously moving the strand in said groove during the welding operation, and thereafter withdrawing the strand endwise from said groove.

12. The improved method of making drills having longitudinal lubricating ducts which consists in laying a duct forming strand in a longitudinal groove of the drill bar, thereafter filling said groove, thereafter removing said strand, and finally peripherally finishing said bar.

13. The improved method of making drills having a longitudinal lubricating duct which consists in enveloping a longitudinal duct forming strand in the body of the drill, withdrawing said strand to leave a duct in the drill bar, and drilling a duct through the cutting end of the drill which communicates with the duct thus formed.

In testimony whereof I claim the foregoing as my invention, I hereunto append my signature at Chicago, Illinois, this 29th day of April, 1918.

JOHN J. KUNZER.